Patented Sept. 29, 1925.

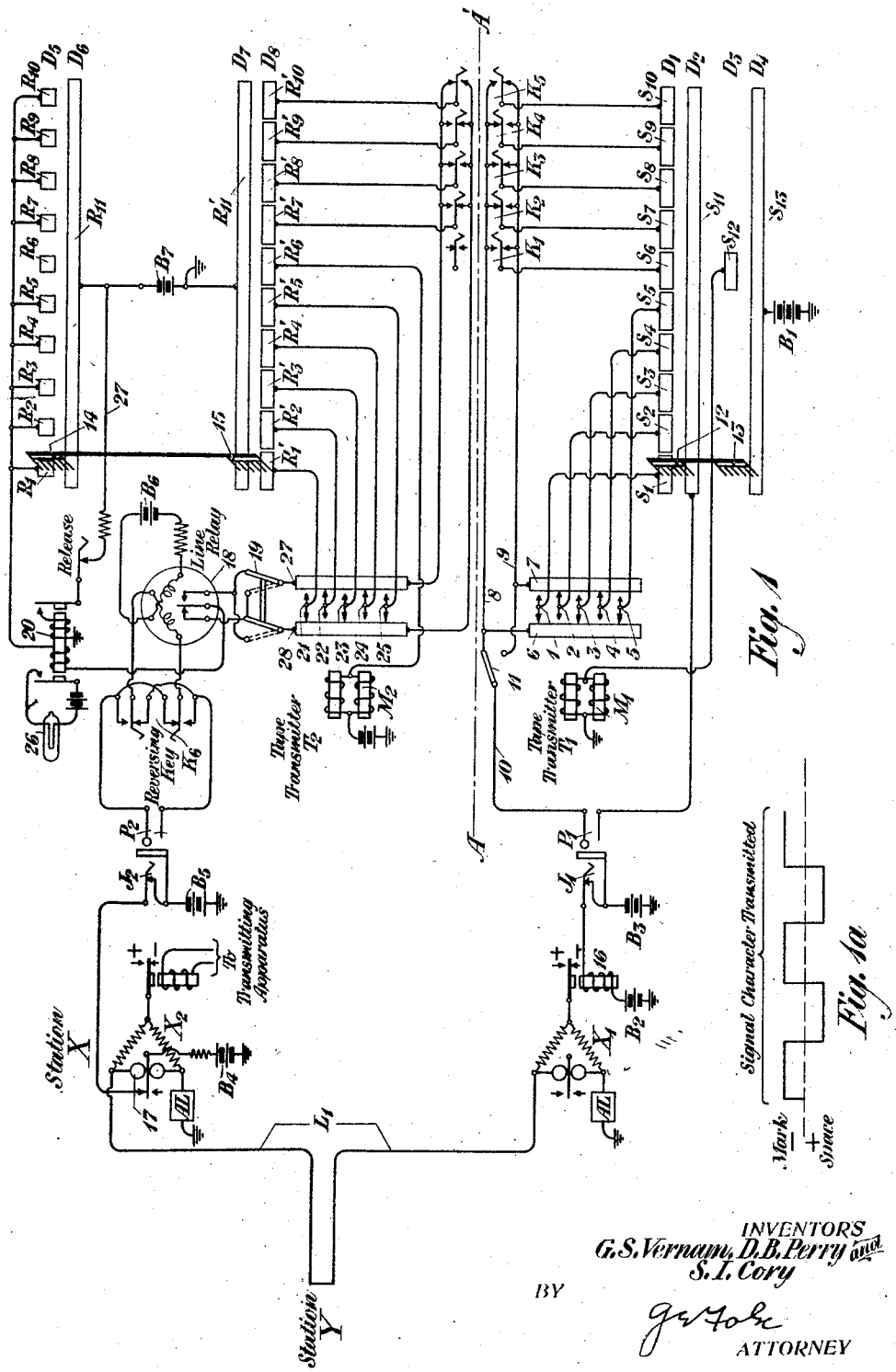

1,555,041

UNITED STATES PATENT OFFICE.

GILBERT S. VERNAM, OF BROOKLYN, NEW YORK, DONALD B. PERRY, OF MAPLEWOOD, NEW JERSEY, AND SAMUEL I. CORY, OF ELMHURST, NEW YORK, ASSIGNORS TO AMERICAN TELEPHONE AND TELEGRAPH COMPANY, A CORPORATION OF NEW YORK.

DISTORTION-MEASURING SYSTEM.

Application filed May 25, 1923. Serial No. 641,452.

*To all whom it may concern:*

Be it known that we, GILBERT S. VERNAM, DONALD B. PERRY, and SAMUEL I. CORY, residing at Brooklyn, Maplewood, and Elmhurst, in the counties of Kings, Essex, and Queens and States of New York, New Jersey, and New York, respectively, have invented certain Improvements in Distortion-Measuring Systems, of which the following is a specification.

This invention relates to electrical measuring systems and particularly to means for determining the existence and magnitude of distortion of telegraph signaling impulses produced in the course of transmitting the said impulses.

In transmitting telegraph signals, each made up of a plurality of impulses and each impulse having a definite length, distortion of the impulses and therefore of the signals may be produced by various causes inherent in the line or in the apparatus connected therewith or both. The distortion with which this invention is concerned manifests itself in lengthening or shortening the duration of the impulses which constitute the signal transmitted over the line. This lengthening or shortening of the duration of the impulses interferes with the proper recording of the signals at any station connected with the said line and consequently impairs the efficiency of transmission.

Various systems for determining the existence and magnitude of this form of distortion have been devised and used, but due either to the complexity of the apparatus required or to other causes such use has not been very wide. One such method consists in the use of a Wheatstone tape recorder connected with the receiving end of a line to which perfect signals are applied at the sending end for the purpose of recording the said signals at the receiving end. The tape records of these signals are then measured whereby any distortion and the magnitude thereof may be determined. This method, however, is quite laborious and is unsatisfactory in other ways.

It is the object of this invention to provide means for the measurement of telegraph distortion of the character heretofore described which would not only be portable but also give directly the complete results of such measurements.

This invention will be clearly understood from the following description when read in connection with the attached drawing of which Figure 1 shows one form of embodiment of the invention, and Fig. 1ª is a graph used in describing Fig. 1.

In Fig. 1 there is disclosed below the line AA' the transmitting apparatus by means of which telegraph signals may be applied to the line $L_1$ which extends to some distant point and is there looped back to the same station from which the signals were transmitted and are received by the receiving apparatus shown in Fig. 1 above the line AA'. That is to say, in the form we have chosen to disclose our invention the transmitting and receiving apparatus are located at the same station and the circuit is so connected at some distant office that the transmitted signals are received at the same station from which they are sent. It is to be understood, however, that the invention is by no means limited to the making of distortion measurements upon looped circuits but is also adapted for the measurement of distortion over what may be termed "straightway circuits" where the transmitting and receiving apparatus are in different offices. The invention may also be used in measuring the distortion produced by apparatus per se or by lines containing apparatus such as repeaters.

The transmitting apparatus which as stated is shown in Fig. 1 below the line AA', comprises a tape transmitter $T_1$ which may be of any well known type comprising a plurality of movable contact levers designated 1 to 5 inclusive. These levers are controlled by the perforated tape through certain selecting pins (not shown) which serve to cause the contact levers to take a position against one or the other of the busbars 6 or 7, the relative position depending upon the presence or absence of a perforated hole in the tape above the selecting pin of a particular contact lever. The levers 1 to 5 are connected with the segments $S_1$ to $S_5$ respectively, of the segmental distributing ring $D_1$. The stepping magnet $M_1$ of the tape transmitter $T_1$, by means of which the tape is stepped forward during the course of operation of the transmitter, is connected with the segment $S_{12}$ of the ring $D_3$. The remaining segments of the ring $D_1$ designated $S_6$ to $S_{10}$ inclusive, are connected with the movable contact springs of the keys $K_1$ to $K_5$ inclusive. The fixed contacts of these keys are connected with the conductors 8 and 9 with which are also connected the busbars 6 and 7 respectively. The conductors 8 and 9 are adapted to be connected with the tip contact of the plug $P_1$ by means of the reversing switch 11. The sleeve contact of the plug $P_1$ is connected with the ring $D_2$ which is adapted to be connected by means of the brush 12 with the various segments of the ring $D_1$. The ring $D_4$ which is adapted to be effectively connected with the segment $S_{12}$ of the ring $D_3$ by means of the brush 13, has connected therewith a source of potential $B_1$, the purpose of which will clearly appear later. The brush 12 is preferably fixedly connected with the brush 13 but electrically insulated therefrom so that both brushes will at any instant be in the same angular position with respect to the distributing rings.

The plug $P_1$ is adapted to be inserted in the jack $J_1$, the tip contact of which is connected with the transmitting relay 16. Sources of potential of opposite polarity designated $B_2$ and $B_3$ are connected with the relay 16 and with the sleeve contact of the jack $J_1$. It will be seen from the foregoing description of the apparatus comprised within the transmitter per se, that when the reversing switch 11 is upon either of its contacts and the contact levers 1 to 5 inclusive are touching either of the busbars 6 or 7, depending upon the signal character represented by the perforations of the tape which may be in engagement with the pins of the transmitter at that instant, that the relay 16 will be energized by current impulses as the brush 12 travels over the successive segments $S_1$ to $S_5$; and by the operation of the armature of the relay 16 between the contacts thereof similar current impulses will be applied to the bridge arms of the duplex terminal apparatus designated $X_1$. The terminal circuit embraces apparatus of well known types and needs no detailed description here. The line $L_1$ may be assumed to extend to a distant station Y where it is looped back to the station X and is there connected with the terminal circuit $X_2$ which circuit may be similar to $X_1$. The polar receiving relay 17 of this terminal circuit has its armature connected with the battery $B_4$ and one of its contacts is connected with the tip contact of the jack $J_2$ of which the sleeve is connected with the battery $B_5$. This jack is intended to cooperate with the plug $P_2$ by means of which the receiving apparatus for the measurement of distortion may be connected effectively with the line $L_1$. This plug is connected through the reversing key $K_6$ with one of the windings of the line relay 18, the other winding of which is connected with a source of potential $B_6$. This receiving apparatus comprises a tape transmitter $T_2$ which is intended to be operated in synchronism with the tape transmitter $T_1$. The contact levers designated 21 to 25 inclusive, are connected with the segments $R_1'$ to $R_5'$ respectively, of the distributing ring $D_8$. The stepping magnet $M_2$ of the transmitter $T_2$ is connected with the segment $R_6'$ of the same ring. The segments $R_7'$ to $R_{10}'$ of the same ring are connected with the upper movable contact springs of the switches $K_2$ to $K_5$, inclusive. By the use of the segment $R_6'$ for the actuation of the magnet $M_2$ it has been rendered possible to avoid the use of an extra segment similar to $S_{12}$ of the transmitting apparatus. If in the receiving apparatus such a segment as $S_{12}$ be used for the operation of $M_2$, then the segment $R_6'$ may be connected with the upper contact spring of the key $K_1$. It is desirable to point out that if the receiving apparatus is used at a different station from that at which the transmitting apparatus is located, separate keys corresponding to $K_1$ to $K_5$, inclusive, would be necessary at the transmitting and receiving stations. The segments of the ring $D_8$ are effectively connected with the grounded common segment $R_{11}'$ of the ring $D_7$ by means of the brush 15.

The contacts of the line relay 18 are connected with the contact points of the reversing switch 19, the movable arms of which are connected with the busbars 27 and 28 of the tape transmitter $T_2$. The armature of the relay 18 is connected through one of the windings of the relay 20 with the shortened segments $R_1$ to $R_{10}$ inclusive, of the distributing ring $D_5$. The relay 20, when energized, operates a visual or audible signal 26 by means of which the presence of distortion of the received signals is made known. While the relay 20 and a visual signal 26 have been shown for the purpose of describing this invention, other forms of indicating devices may be used such as message registers or a telegraph sounder. Segments of the ring $D_5$ are effectively connected with the common segment $R_{11}$ of the ring $D_6$ which is connected with a source of potential $B_7$. This same source is also connected by a conductor 27 with the right-hand armature of relay 20 by means of which the said relay may be locked up after initial energization. A release key is included in the locking circuit of relay 20 to facilitate the restoration to normal of the said relay after it has locked up. All of the brushes of the distributing rings $D_1$ to $D_8$ inclusive, are operated in synchronism, which, if the transmitting and receiving apparatus are at the same station, may be done by connecting all of said brushes to the same driving shaft. If the transmitting and receiving apparatus are at different stations, some form of synchronous driving apparatus such, for example, as the well known phonic wheel motor, may be used. Although the brushes of the various rings are operated in synchronism they would not under ordinary conditions be in phase each with the others, because of the time lag between the transmission and reception of the signaling impulses, which will be made clear hereinafter.

The manner in which the aforedescribed system functions in order to measure the distortion of the signaling impulses transmitted over a line is as follows:

Let us assume that by means of the first five segments of the ring $D_1$ there will be applied to the line $L_1$ for each revolution of the said ring, a signal character which will be determined by the perforations of the tape which controls the transmitter $T_1$. And, furthermore, it will be assumed that by means of the last five segments designated $S_6$ to $S_{10}$ of the said ring, there will be applied to the line $L_1$ a definite signal character depending upon the operation of the keys $K_1$ to $K_5$ inclusive. If, for example, the first signal character to be transmitted over the line is such as is shown in Fig. 1ª comprising alternate marking and spacing impulses, the levers of the transmitter $T_1$ will be so actuated that the first, third and fifth will make contact with the busbar 6 and the second and fourth with the busbar 7. Assuming that the switch 11 is in the position shown in the figure, current will flow from the battery $B_3$ over the sleeve contacts of jack $J_1$ and plug $P_1$, through the brush 12 connecting segments $S_{11}$ and $S_1$, thence through the contact between the lever 1 and the busbar 6, over the conductor 10 and through the winding of relay 16 to the battery $B_2$ which is of opposite polarity to $B_3$. Relay 16 will be energized thereby and its armature will be brought in contact with the marking battery whereby an impulse will be transmitted over the line $L_1$ which will be sustained throughout the time necessary for the brush 12 to traverse the segment $S_1$. This impulse will energize the relay 17 of the terminal station $X_2$ so that current will flow from the battery $B_4$ through the upper contact of relay 17, through the tip contacts of the jack $J_2$ and the plug $P_2$ and through the left-hand winding of the relay 18, thence to the battery $B_5$ which is of opposite polarity to $B_4$. The armature of the relay 18 will be moved from its left-hand contact where it is normally held by the energization of its right-hand winding by the local source $B_6$ to its right-hand contact which is connected with the busbar 27 when the switch 19 is in the position shown in the figure. While the signal impulse is actuating the line relay 18, the levers 21 to 25 inclusive, will occupy the same positions relative to the busbars 27 and 28 that the corresponding levers 1 to 5 of the transmitter $T_1$ do with respect to the busbars 7 and 6, because the tape of the transmitter $T_2$ has the same signal characters as the tape of the transmitter $T_1$ and the two transmitters are operated in synchronism, but suitably adjusted for the time lag in the transmission of the signaling impulses from $T_1$ to $T_2$.

If we assume that the receiving rings $D_5$ to $D_8$ inclusive have been properly adjusted to compensate for the time lag between the transmission and the reception of signals, the brushes 14 and 15 will make contact with the segments $R_1$ and $R_1'$ when the corresponding undistorted signal impulse operates the line relay 18. With no distortion and with the rings properly adjusted to compensate for the time lag in the transmission of signals, the relay 20 will not be operated when the brushes 14 and 15 make contact with the segments $R_1$ and $R_1'$ because the said circuit which includes the source $B_7$ will be open by virtue of the fact that the lever 21 is in contact with the left-hand busbar 28 and the armature of relay 18 is against its right-hand contact.

In similar manner when a spacing impulse is transmitted over the line $L^1$ the armature of the relay 18 at the receiving station will be moved to its left-hand contact. The transmittal of this spacing impulse, which is the second impulse of the transmitted signal character, is controlled by the position of the contact lever 2 and by the traversing of the segment $S_2$ by the brush 12. Since the contact lever 22 of the transmitter lever $T_2$ occupies the same relative position with respect to its busbars as the lever 2 of the transmitter $T_1$ does with respect to its busbars, the circuit through the relay 20 will be open when the brushes 14 and 15 begin to traverse the segments $R_2$ and $R_2'$ respectively. This result follows because during the reception of the spacing impulse the armature of the relay 18 is touching its left-hand contact which is connected with the busbar 28, while at this time the contact lever 22 is touching the right-hand busbar 27 so that the circuit which includes the source $B_7$ and the relay 20 will be open at the contact lever. As the brush 12 moves over the segments $S_3$, $S_4$ and $S_5$ of the ring $D_1$ impulses corresponding to the relative positions of the levers 3, 4 and 5 will be transmitted over the line $L_1$. These impulses will operate the line relay 18 and if there is no distortion of the said impulses the relay 20 will remain unoperated during the movement of the brushes 14 and 15 over their respective segments.

After the signal represented by the impulses set up on the segments $S_1$ to $S_5$ inclusive, has been transmitted, the signal set up on the segments $S_6$ to $S_{10}$ inclusive, will then be transmitted by the movement of the brush 12 thereover. With the passage of the brush 12 onto the segment $S_6$ the brush 13 which moves in phase with the brush 12 passes onto the segment $S_{12}$, thereby connecting segments $S_{12}$ and $S_{13}$ and permitting current to flow from the battery $B_1$ through the winding of the magnet $M_1$ which steps ahead the tape of the transmitter $T_1$ so as to control the position of the cam levers 1 to 5 inclusive, in accordance with the new signal character represented by that position of the tape. It will be seen therefore, that the transmitter $T_1$ is in a position to transmit the next signal character over the line $L_1$, but it does not do so until the brush 12 has traversed segments $S_6$ to $S_{10}$. The signal character set up upon the latter group of segments is controlled by the operation of the keys $K_1$ to $K_5$ inclusive. With the keys in the position shown in the figure and with the switch 11 also in the position shown, the circuit of the relay 16 will be open at the key $K_1$ when the brush 12 traverses the segment $S_6$, thereby allowing the armature of the relay 16 to fall back and impress a spacing signal upon the line $L_1$. As the brush 12 traverses the segments $S_7$ to $S_{10}$ inclusive, there will be impressed upon the line $L_1$ alternate marking and spacing impulses with the keys $K_2$ to $K_5$ in the position shown. At the receiving end of the line the magnet of the transmitter $T_2$ would be operated when the brush 15 passed onto the segment $R_6'$ and the tape would be stepped ahead in synchronism with the movement of the tape of the transmitter $T_1$. The impulse transmitted over the line by the passage of the brush 12 over the segment $S_6$, would be received at the distant end of the line and the line relay would be actuated, but in view of the fact that the segment $R_6'$ has been utilized for the operation of the magnet $M_2$ and the corresponding segment $R_6$ of the ring $D_5$ has been left open, no indication of distortion of this impulse will be given by the receiving apparatus. This imposes no serious limitation upon the efficiency of this method of distortion measurement and, as has been pointed out heretofore, this impulse may be received and its distortion determined if a separate segment be inserted at the receiving end of the line corresponding to the segment $S_{12}$, such segment being connected with and intended to control the magnet $M_2$.

In order to measure distortion the receiving apparatus should be calibrated during the reception of undistorted signals. In making loop tests wherein the transmitting apparatus is at the same station as the receiving apparatus, it is a simple matter to connect the two apparatuses directly together so that undistorted signals will be impressed upon the receiving apparatus. In making straightway tests where the receiving apparatus is at a different station from the transmitting apparatus, it may be necessary to have at the receiving station a separate source of undistorted signals. The rings $D_5$ to $D_8$ inclusive are preferably arranged so that they may be oriented relative to the brush driving-shaft. While the undistorted signals are actuating the line relay 18 the said rings should be oriented together, first in one direction until the point is reached where they are so far out of phase with the incoming signals as to cause the operation of the signal 26. Upon the closing of the left-hand contact of relay 20, the signal 26 is operated which indicates that the orientation has been sufficient as to produce failure in the reception of signaling impulses. The closing of the right-hand contact energizes the locking winding of the relay which thereafter remains locked until released by the operation of the release key. The operation of the relay 20 results from the simultaneous connection of the contact lever of the tape transmitter and of the armature of the line relay with the same busbar. As heretofore pointed out, when an undistorted impulse is received, the armature and the contact lever of the transmitter $T_2$ corresponding to that impulse are at the same instant of time connected with different busbars. The movement of the rings $D_5$ to $D_8$ simply means that the synchronism existing between the operation of the line relay and the passage of the brushes over the corresponding contacts of the various distributing rings has been destroyed. The distance through which the rings $D_5$ and $D_8$ may be oriented while receiving undistorted signals before failure takes place, is known as the "margin". When the margin has been obtained for orientation of the rings in one direction, the rings are then oriented in the opposite direction until failure is evidenced by the operation of the signal 26, and the margin in that direction is thus obtained.

With the apparatus thus calibrated, that is to say, having determined the margin for undistorted signals the next step is to adjust the receiving apparatus for time lag. Signals should be transmitted over the line and the rings $D_5$ and $D_8$ should be oriented that the brushes 14 and 15 will make contact with segments $R_1$ and $R_1'$ when the corresponding impulse operates line relay 18. Having the apparatus calibrated and adjusted for time lag, the next step is to measure the distortion of signals.

If the signals received over the line $L_1$ by the relay 18 are distorted, that is to say, a certain impulse may be lengthened and its adjacent impulse or impulses may be shortened, such distortion manifests itself in the diminution of the margin through which the rings $D_5$ and $D_8$ may be oriented. With undistorted signals it should be possible to orient the ring $D_5$ to such an extent that undistorted signals would be properly received throughout a range extending from a point approximately midway between $R_1$ and the preceding segment $R_{10}$ to a point approximately midway between $R_1$ and the succeeding segment $R_2$. As distortion increases, this margin is diminished and the magnitude of the distortion may be represented by a fraction whose numerator is the difference between the margins for undistorted and distorted signals and whose denominator is the margin when the signals are undistorted.

It will be seen, therefore, that by means of the system disclosed herein the magnitude of distortion of telegraph signaling impulses, may be efficiently determined. It is also desired to point out that by using a tape transmitter a great variety of signal combinations may be impressed upon and transmitted over the line so that the tendency of the line and its associated apparatus to distort signals may be studied to determine its effect upon signals having different impulse combinations. This is an important characteristic of the invention disclosed herein because it is well known to those skilled in the art, that a certain line may transmit, without appreciable distortion, a signal or signals having certain combinations of impulses but would tend to distort greatly signaling characters having different combinations of impulses.

While this invention has been disclosed in a particular form and arrangement of parts, it is not so limited but is capable of embodiment in other and different forms within the spirit and scope of the appended claims.

What is claimed is:

1. In a distortion measuring system, the combination with an electrical network capable of producing distortion of current impulses transmitted therethrough of signal transmitting means adapted to apply a succession of different signals to said network and signal receiving means also connected with said network and having means to indicate distortion of the received signal.

2. In a distortion measuring system, the combination with an electrical network capable of producing distortion of current impulses transmitted therethrough of a source of signaling impulses connected with said network and having means for changing the successive signals in a predetermined manner and signal receiving means also connected with said network and having means to indicate distortion of the received signals.

3. In a distortion measuring system, the combination with an electrical network capable of producing distortion of current impulses transmitted therethrough of signal transmitting means connected therewith, the said transmitting means having a device for changing in a predetermined manner the successive signals applied by said transmitting means to said network, and signal receiving means adapted to indicate distortion and to measure the magnitude thereof.

4. In a distortion measuring system, the combination with an electrical transmission system capable of producing distortion of current impulses transmitted therethrough of signal transmitting means connected with said transmission system and having means for changing in a predetermined manner the successive signals applied to said transmission system, and signal receiving means adapted to indicate distortion and to measure the magnitude thereof.

5. In a distortion measuring system, the combination with an electrical transmission system of a tape controlled signal-transmitting means, and a tape controlled signal-receiving means having a device connected therewith to indicate distortion of the received signal.

6. In a distortion measuring system, the combination with an electrical transmission system of a printing telegraph transmitting station connected with the said system comprising a tape transmitter, a distributor for applying the signaling impulses to the said line and a printing telegraph receiving station connected with the said system comprising a tape controlled receiving device, a plurality of distributors and means to indicate the distortion of the received signals set up on the said distributors.

7. In a distortion measuring system, the combination with a line of a printing telegraph transmitting station connected with the said line comprising a tape transmitter and distributors for applying the signaling impulses to the said line, a printing telegraph receiving station connected with the said line comprising a tape controlled receiving device, and a plurality of distributors, means to indicate the distortion of the received signal, and means to synchronize the operation of the distributors at the transmitting and receiving stations.

8. In a distortion measuring system, the combination with a line of signal-transmitting means comprising a tape controlled transmitter and also a source of fixed signals, and signal-receiving means comprising a tape controlled receiving device and a plurality of switching devices for the reception respectively of the signals impressed upon the said line by the said tape transmitter and the said source of fixed signals, and means to indicate the distortion of the signals received from their source.

9. In a distortion measuring system, the combination with a line of a transmitting distributor having connected therewith a tape transmitter to set up a succession of different signals upon the said distributor and means to set up a fixed signal upon the said distributor whereby variable and fixed signals may be applied to the said line, and a receiving distributor having connected thereto a tape controlled receiving device and also a plurality of switching means whereby the said variable and fixed signals may be received and means to indicate the distortion of any of the said received signals.

10. In a distortion measuring system, the combination with a line of duplex terminal apparatus connected with each end thereof, tape controlled signal-transmitting means connected with the terminal apparatus at one end of said line, tape controlled signal-receiving means connected with the terminal apparatus at the other end of said line, the said signal-receiving means having connected therewith means to indicate the distortion of the received signal.

In testimony whereof, we have signed our names to this specification this 24th day of May, 1923.

GILBERT S. VERNAM.
DONALD B. PERRY.
SAMUEL I. CORY.